United States Patent
Berg et al.

(10) Patent No.: US 9,081,578 B1
(45) Date of Patent: Jul. 14, 2015

(54) SYSTEM AND METHOD FOR GRAPH CONDITIONING WITH NON-OVERLAPPING ORDERABLE VALUES FOR EFFICIENT GRAPH EVALUATION

(75) Inventors: Paul W. Berg, Seattle, WA (US); Ramasubramanian Balagurunathan, Seattle, WA (US); Simon M. Patrick, Seattle, WA (US); Thomas Yves Paul Helleboid, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 563 days.

(21) Appl. No.: 13/252,722

(22) Filed: Oct. 4, 2011

(51) Int. Cl.
*G06F 17/30* (2006.01)
*G06F 7/36* (2006.01)

(52) U.S. Cl.
CPC .................................... *G06F 7/36* (2013.01)

(58) Field of Classification Search
CPC ............... G06F 17/30657; G06F 17/30864; G06F 17/30598; G06F 17/30412; G06F 17/30422; G06F 8/443
See application file for complete search history.

(56) References Cited

U.S. PATENT DOCUMENTS

| | | | |
|---|---|---|---|
| 6,439,783 B1 * | 8/2002 | Antoshenkov | 1/1 |
| 6,915,290 B2 * | 7/2005 | Bestgen et al. | 1/1 |
| 7,558,802 B2 * | 7/2009 | Yako et al. | 1/1 |
| 7,680,789 B2 * | 3/2010 | Sareen et al. | 707/999.006 |
| 7,962,489 B1 * | 6/2011 | Chiang et al. | 707/741 |
| 8,290,923 B2 * | 10/2012 | Kurapat et al. | 707/706 |
| 8,386,264 B2 * | 2/2013 | Hori et al. | 704/275 |
| 2001/0000536 A1 * | 4/2001 | Tarin | 707/102 |
| 2003/0191740 A1 * | 10/2003 | Stark | 707/1 |
| 2007/0027837 A1 * | 2/2007 | Kutsch et al. | 707/2 |
| 2007/0239969 A1 * | 10/2007 | Biles et al. | 712/223 |
| 2009/0327377 A1 * | 12/2009 | Ylonen | 707/206 |
| 2011/0004581 A1 * | 1/2011 | Schmidt et al. | 706/55 |
| 2011/0225038 A1 | 9/2011 | Fontoura et al. | |

* cited by examiner

*Primary Examiner* — Tony Mahmoudi
*Assistant Examiner* — Michael Le
(74) *Attorney, Agent, or Firm* — Robert C. Kowert; Meyertons, Hood, Kivlin, Kowert & Goetzel, P.C.

(57) ABSTRACT

Embodiments may include transforming a subgraph into a new subgraph such that, for a given logical operation of the new subgraph, more primitives are grouped under that logical operation relative to the original subgraph. Each primitive may represent a range of values. The primitives of a given logical operation of the transformed subgraph may represent values that overlap. Embodiments may include performing a union operation on the primitives of the given logical operation of the transformed subgraph to generate an ordered set of non-overlapping values. Embodiments may include replacing the given logical operation of the transformed subgraph with information specifying that set. In embodiments, dependent on the given logical operation's complexity, the requisite time to perform a search operation for a value within the ordered set of non-overlapping values is less than the requisite time to perform the given logical operation on its respective primitives.

28 Claims, 9 Drawing Sheets

| Region ID | R2 | R3 | R4 | R5 | R6 | R7 | R8 | R9 |
|---|---|---|---|---|---|---|---|---|
| Type | State | Country | TRUE | AND | Postal Code | Country | NOT | OR |
| Data | WA | US | | R2, R3, R4, R6, R8 | 980-985 | CA | R7 | R3, R7 | graph data 100

*FIG. 1*

FIG. 2A graph data 200a

| Region ID | R10 | R11 | R12 | R13 | R14 | R15 | ... | Rn |
|---|---|---|---|---|---|---|---|---|
| Type | OR | Postal Code | Postal Code | Postal Code | Postal Code | Postal Code | ... | Postal Code |
| Data | R11, R12, R13...Rn | 930015329 | 970-985 | 990-995 | 994-895 | 7123-7124 | ... | 6120127 |

FIG. 2B graph data 200b

| Region ID | R20 | R21 | R22 | R23 | R24 |
|---|---|---|---|---|---|
| Type | Set | Postal Code | Postal Code | Postal Code | Postal Code |
| Data | R21, R22, R23, R24 | 6120127 | 7123-7124 | 970-985 | 890-895 |

| Region ID | Type | Value |
|---|---|---|
| R1 | OR | R2, R3, R4, R5, R9 |
| R2 | Postal Code | 0-2 |
| R3 | Postal Code | 4-6 |
| R4 | Postal Code | 5-7 |
| R5 | Postal Code | 1-1 |
| R6 | Country | US |
| R7 | AND | R1, R6 |
| R8 | Postal Code | 4-7 |
| R9 | City | Seattle | graph data 500

| Region ID | Type | Value |
|---|---|---|
| Unprocessed: | | |
| R7 | AND | R1, R6 |
| Processed: | | |
| R2 | Postal Code | 0-2 |
| R6 | Country | US |
| R8 | Postal Code | 4-7 |
| R9 | City | Seattle |
| ~R1 | Set | (R2, R8) |
| R1 | OR | ~R1, R9 | graph data 700

*FIG. 7*

| Region ID | Processed | Type | Value |
|---|---|---|---|
| R2 | | Postal Code | 0-2 |
| R6 | | Country | US |
| R8 | | Postal Code | 4-7 |
| R9 | | City | Seattle |
| ~R1 | | Set | (R2, R8) |
| R1 | | OR | ~R1, R9 |
| R7 | | AND | R1, R6 | graph data 800

SYSTEM AND METHOD FOR GRAPH CONDITIONING WITH NON-OVERLAPPING ORDERABLE VALUES FOR EFFICIENT GRAPH EVALUATION

BACKGROUND

Large distributed computing environments may include multiple components or services that may be queried for information. In many cases, these services may rely on databases or other information sources for processing requests. Generally, the less efficient the structure of these information sources, the longer the processing time for a given service query. For instance, inefficiently structured data may require a significant quantity of time and/or computational power to traverse. In one example, for a service generally focused on information retrieval, an inefficiently structured information source may hinder the service's ability to quickly process information retrieval requests. Similarly, computational requests to perform some action that depends on retrieved information may be slowed by inefficiently structured information sources. In some cases, additional hardware resources, such as additional physical or virtual processing resources, may be used to compensate for the aforesaid inefficiencies. Generally, these processing resources require capital costs that may hinder an entity's ability to thrive in a highly competitive commercial environment.

While the system and method for graph conditioning with non-overlapping orderable values for efficient graph evaluation is described herein by way of example for several embodiments and illustrative drawings, those skilled in the art will recognize that the system and method for graph conditioning with non-overlapping orderable values for efficient graph evaluation is not limited to the embodiments or drawings described. It should be understood, that the drawings and detailed description thereto are not intended to limit the system and method for graph conditioning with non-overlapping orderable values for efficient graph evaluation to the particular form disclosed, but on the contrary, the intention is to cover all modifications, equivalents and alternatives falling within the spirit and scope of the system and method for graph conditioning with non-overlapping orderable values for efficient graph evaluation as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Introduction

Figure 1:
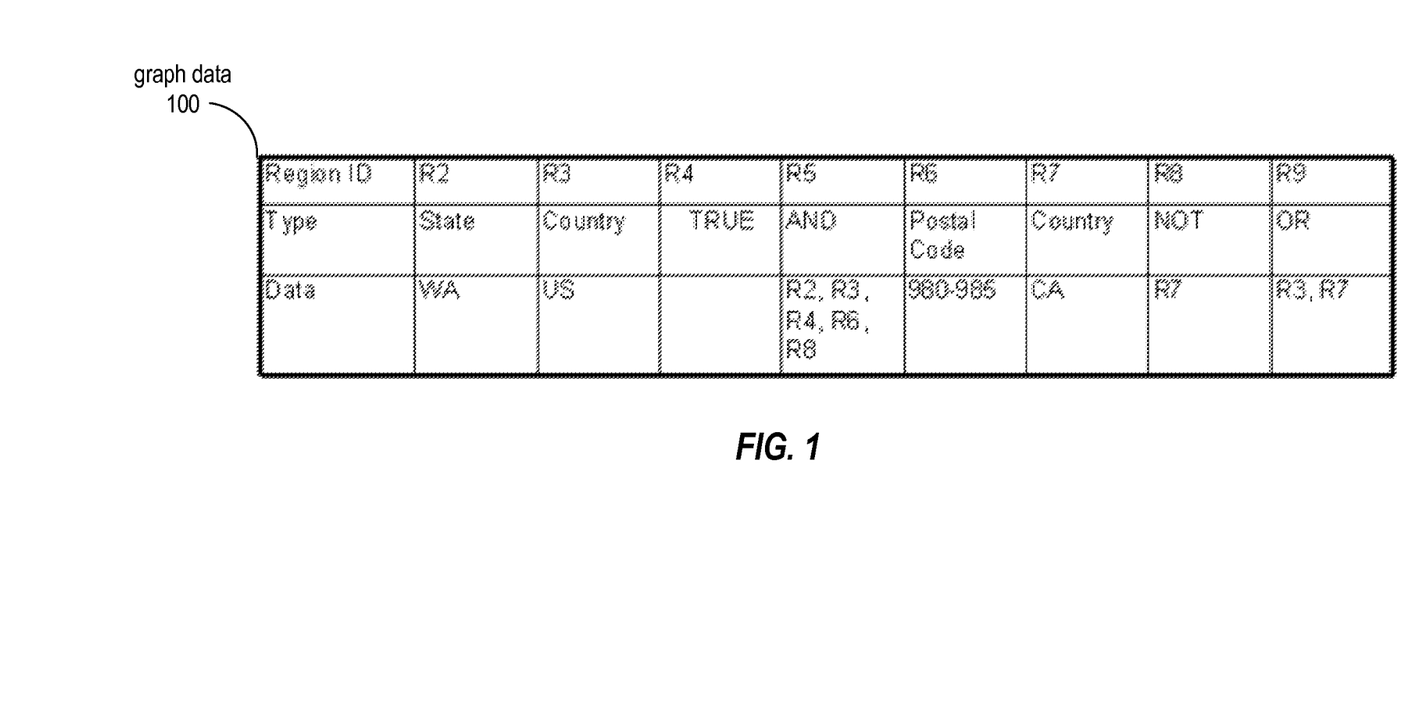
FIG. 1 illustrates graph data representing example regions represented by the graph, according to some embodiments.

Various embodiments of a system and method for graph conditioning with non-overlapping orderable values for efficient graph evaluation are described. In various embodiments, graphs including one or more subgraphs may be utilized to represent values that may be evaluated by one or more logical operations, such as Boolean operations (e.g., AND, OR, NOT, etc). While instances herein may refer to these values as representing geographic regions for clarity of description, embodiments are not limited to using values in this manner. FIG. 1 illustrates an example collection of subgraphs represented in table form where each subgraph represents a respective region. In various embodiments, these subgraphs (and any other subgraphs described herein) may collectively form an acyclic directed graph or some other type of structured graph.

In FIG. 1, graph data 100 may represent data forming an acyclic directed graph or another type of graph, according to various embodiments. In the illustrated embodiment, multiple subgraphs are identified by a region identifier (ID). In the illustrated embodiment, each region R2-R9 may represent either a primitive test for evaluating an address or a logical operation (e.g., Boolean operators, such as AND, OR, NOT, etc.) to be performed on other regions. Conceptually, each region may represent a node within a graph. Furthermore, each node and any descendent nodes (if any) may represent a subgraph within the graph. In the illustrated example, all regions except R5 and R9 represent child nodes and thus have no descendents. In terms of subgraphs, these nodes may each be considered a subgraph having an order of one. Regions R5 and R9 may each define more complex subgraphs made up of other regions. For instance, region R5 may define a subgraph that is the conjunction (i.e., logical AND) of five other regions. In this example, subgraph R5 has an order of seven—one node representing the logical AND, four nodes representing the child nodes R2, R3, R4 and R6, and two nodes representing the logical NOT of region R7 (as specified by region R8).

In various embodiments, any number of regions may be added to the graph data. For instance, a merchant might create multiple different regions to represent multiple different delivery zones serviced by different shipment carriers. Furthermore, graph data 100 may also include primitives that have different types, as illustrated by the state, country, and postal code and other primitive not illustrated (e.g., city, county, etc.). In some cases, trivial primitives (e.g., TRUE, FALSE) may also be included. As described in more detail, some of these primitives may be orderable (e.g., according to alphabetic or numeric order). In other cases, some primitives, such as postal codes may not be directly orderable absent some modification in the way these codes are represented within the graph data. For instance, postal codes may be specified by prefixes that designate ranges of postal codes. These postal codes may be only partially orderable in cases where one or more of these ranges overlap.

As described in more detail below, embodiments may include a graph evaluator component configured to evaluate graph data and return a result. For instance, one type of function that the graph evaluator may perform is a determination of whether an address resides in a given region. For instance, the graph evaluator may take as input an address and a region ID and determine whether that address is included within the region defined by that region ID. An example system that may utilize such a configuration may include an electronic market place that needs to determine whether a customer's delivery address resides in a region serviced by a shipment carrier, although embodiments are not limited to such examples. The graph evaluator may locate the region specified by the request and perform a test to determine whether the address meets the requirements of that region (e.g., determine whether the address resides within that region). If the address does reside within that region, the graph evaluator may return true. If the address does not reside within that region, the graph evaluator may return false. In one non-limiting example, the graph evaluator may be utilized to test a customer address against multiple delivery zones associated with different shipment carriers. Client systems may then use that information to, for example, determine shipment pricing for a customer's shipment.

Evaluation Time of Large Disjunctions

In various embodiments, the graph evaluator described herein may be relied on to determine whether a particular shipment carrier can deliver to a given customer's address. In some cases, delivery areas may include many (e.g., up to tens of thousands or more) postal code ranges defined as a large disjunction. Furthermore, because either zero or one postal code will match the customer's address in most instances, much if not all of the postal code ranges in the disjunction may be tested against the customer's address. In some cases, this may significantly impact the performance of the graph evaluator for a given set of hardware resources.

Figure 2A:
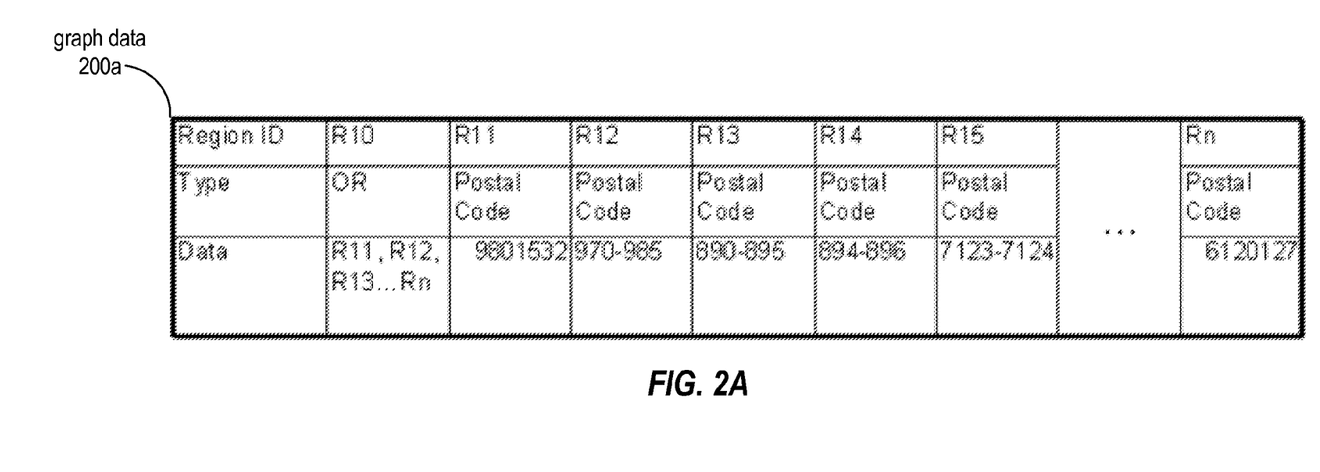
FIG. 2A illustrates graph data including region values that are only partially orderable, according to some embodiments.

FIG. 2A illustrates one example of a disjunction as described above. In the illustrated example, graph data 200a defines multiple regions. In this particular example, regions R11-Rn are children of region R10, which is defined as a disjunction (logical OR) of regions R11-Rn. If the graph evaluator described herein were to receive a request to determine whether a particular address resides within region R10, the graph evaluator may need to traverse many if not all of the illustrated postal codes. For instance, consider two different requests. The first request is request to determine whether an address including the postal code 7123554 resides within region R10. If the graph evaluator were to evaluate each child of region R10 in order (e.g., R11, then R12 and so on), the graph evaluator may eventually determine that the postal code of the request resides in the postal code range of region R15 (a component of region R10) and thus return TRUE for the request. Even in this case where a result of TRUE was returned, the graph evaluator may be restricted to evaluating the request in linear time as the postal code ranges are not fully orderable. For instance, region R12 wholly includes region R11 as the postal code range 9700000-9950000 includes the postal code 9801532 (note prefix range 970-995 is a notational convenience that represents the postal code range 9700000-9950000 for the 7 digit postal codes in this example). In another example, region R13 (postal code range 890-895) overlaps region R14 (postal code range 894-895). As such, when processing the request, these ranges may not be evaluated with techniques that are restricted to completely orderable data sets, such as binary search trees as described in more detail below.

Figure 2B:
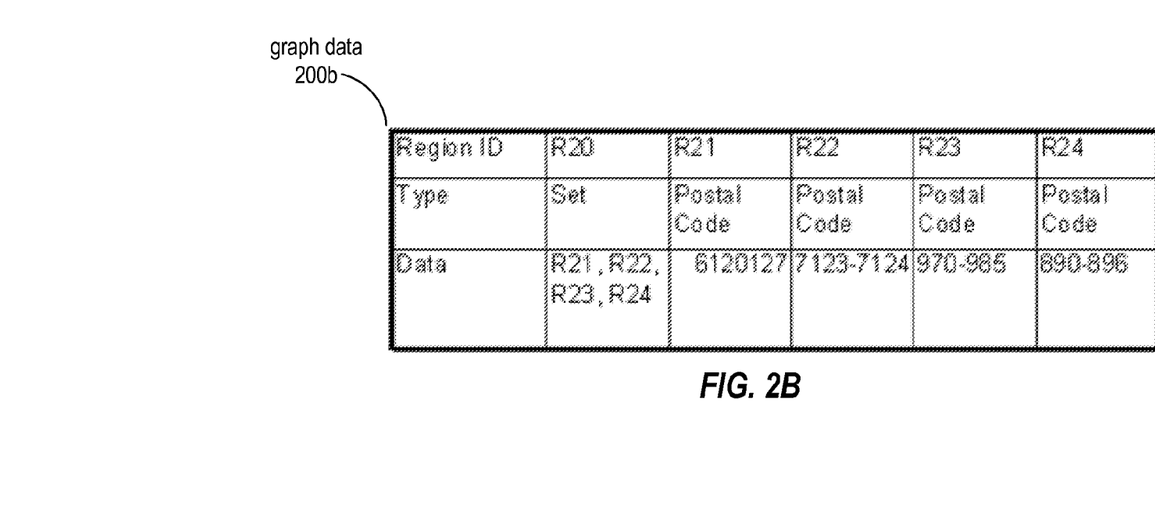
FIG. 2B illustrates logically equivalent graph data represented by an ordered set of non-overlapping values, according to some embodiments.

As described in more detail below, various embodiments may utilize techniques to transform a first subgraph, such as the defined by region R10 of FIG. 2A, to a second logically equivalent subgraph that is not restricted to linear time evaluation and more specifically a logically equivalent subgraph that may be evaluated faster than linear time (e.g., a subgraph that may be evaluated in logarithmic time), thus elevating the performance of the system (and/or decreasing the hardware requirements of the system). FIG. 2B illustrates one example of such a subgraph. In the illustrated embodiment, graph data 200b may be generated based on graph data 200a (of FIG. 2a). As described in more detail below, this type of transformation may be performed by a graph condition component in some embodiments. In the illustrated embodiment, the subgraph represented by graph data 200b may be structurally different yet logically equivalent to graph data 200a of FIG. 2a. Embodiments may perform one or more transformations to generate this new subgraph. For instance, as illustrated, the logical OR operation may be replaced with a "Set" primitive type that may represent an ordered set that is searchable in faster-than-linear time (e.g., logarithmic time O(log n)). In one particular example, this set may be searched in logarithmic time using binary search techniques, although embodiments are not limited to this specific type of search. In the illustrated example, the region R20's set may include regions R21, R22, R23 and R24. Unlike regions R11-Rn, these regions may be completely orderable sets of values (i.e., none of the values or range of values overlap). To structure the data in this way, embodiments may generate regions R21, R22, R23 and R24 as the union of the postal code ranges R11-Rn. In this way, region R20's set of postal code ranges may form non-overlapping ordered sets that may be searched in faster-than-linear time (e.g., logarithmic time), which may elevate the performance of the graph evaluator described herein when evaluating requests that depend on such graph data.

The above-described process for transforming unorderable and/or partially orderable sets is intended as a non-exhaustive overview of these techniques; multiple variations and modifications to these techniques, some of which are described in more detail below, may be implemented in various embodiments. For instance, as described in more detail below, embodiments may include performing one or more transformations to broaden the candidate pool of region values (e.g., postal code values) before the batching of sets is performed. These and other variations are described in more detail below.

Example System Configuration

Figure 3:
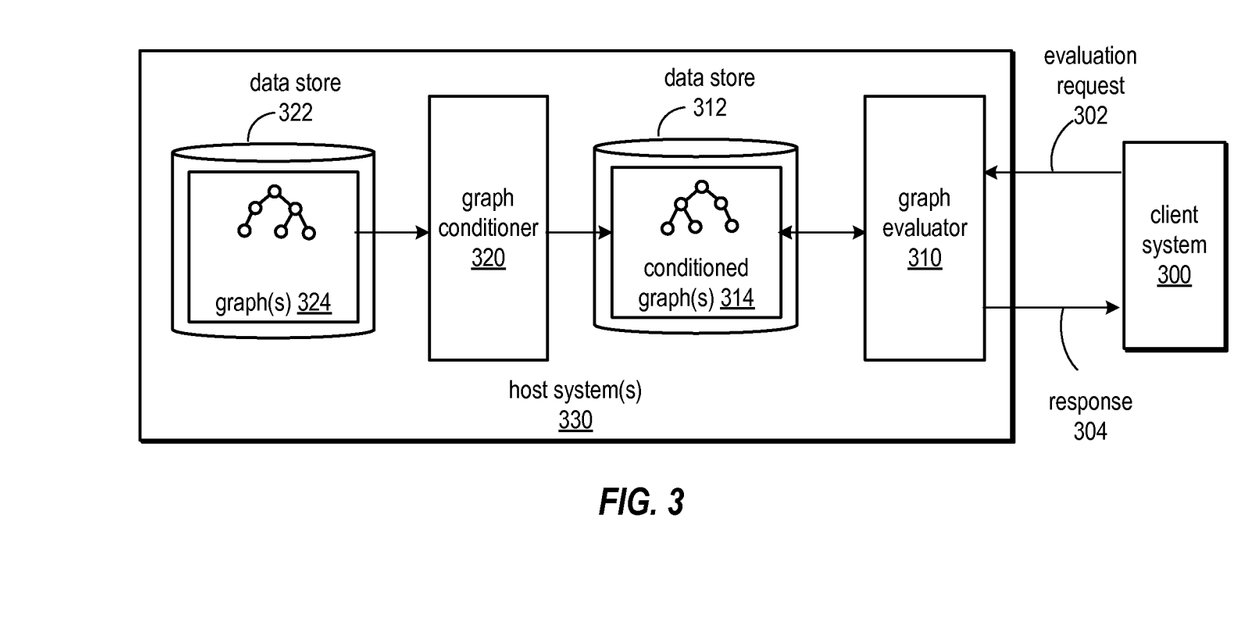
FIG. 3 illustrates an example system configuration according to some embodiments of the system and method for graph conditioning with non-overlapping orderable values for efficient graph evaluation.

FIG. 3 illustrates an example system configuration according to various embodiments. In the illustrated embodiment, host system(s) 330 (and the components illustrated therein) as well as client system 300 may be implemented by one or more computers, such as the computer system of FIG. 9 described below. In the illustrated embodiment, one or more graphs 324 may be constructed within a data store 322. These graphs may include multiple subgraphs, such as the regions described above with respect to FIGS. 1 and 2A, for example. In the illustrated embodiment, graph(s) 324 may represent multiple subgraphs, each of which may include one or more subgraphs, such as the regions described above. In one non-limiting example, a merchant may create a region subgraph for each different delivery zones of the shipment carriers that the merchant has a business relationship with. In one non-limiting example, each delivery zone may be comprised of a combination of country and postal codes. In other cases, other combinations of primitives and/or logical operations may be combined to specify a region, such as described above with respect to FIG. 1A. In various embodiments, a given graph 324 may include multiple primitives of the same type (e.g., postal codes) that are either unorderable or only partially orderable in their current state, which may in various embodiments be caused by one or more overlapping primitive values (e.g., overlapping postal code ranges). One example of this is a graph that includes one or more subgraphs similar to that of FIG. 2A described above.

Graph conditioner 320 may perform one or more conditioning techniques on graph(s) 324 to generate conditioned graph(s) 314. These techniques are described in more detail below with respect to FIGS. 4-8. Generally, graph conditioner may perform transformations on graph(s) 324 to generate one or more logically equivalent graph(s) 314. In some cases, whereas graph(s) 324 may include subgraphs (e.g., regions) defined by multiple primitives of the same type (e.g., postal codes) that are either unorderable or only partially orderable in their current state, conditioned graph(s) 314 generally do not include subgraphs with such characteristics. Instead, the conditioned graph(s) include subgraphs that have ordered sets of primitives (e.g., similar to that described above with respect to FIG. 2B), which may be searched in faster-than-linear time (e.g., logarithmic time O(log n)). In one example, conditioned graph(s) 314 may include one or more subgraphs (e.g., regions) represented by a set of primitives with ordered, non-overlapping values that may be searched in logarithmic time by utilizing binary search techniques. Additional details regarding the generation of conditioned graph(s) 314 from graph(s) 324 are described in more detail below with respect to FIGS. 4-8.

Graph evaluator 310 may receive one or more evaluation requests 302 from various client systems, such as client system 300. For instance, graph evaluator 310 may be a component of a merchant's electronic commerce ("e-commerce") computing environment and client system 300 may be another component of that e-commerce computing environment. In some embodiments, graph evaluator 310 may provide a network-accessible service interface that may be queried by other systems, such as client system 300. In some embodiments, evaluation request 302 may include a customer address (or another address of interest) and a region ID (e.g., an identifier of a particular node or subgraph within conditioned graph(s) 314). The address may consist of one or more values that generally correspond to primitive types of the conditioned graph(s) 314. For instance, an address may include a city, county, state, country, postal code, or even a street address. Graph evaluator 310 may be configured to test the region identified by the region ID of request 302 to determine whether the address resides within that region. For instance, as described above, a merchant may define delivery zones for different shipment carriers as regions and the graph evaluator may be utilized to test a customer address against multiple delivery zones associated with different shipment carriers. If the customer address of request 302 resides within the region defined by request 302, graph evaluator 310 may send a response 304 that indicates the address resides within that region (e.g., TRUE). If the customer address of request 302 does not reside within the region defined by request 302, graph evaluator 310 may send a response 304 that indicates the address does not reside within that region (e.g., FALSE). Client system 300 may then use that information to, for example, determine shipment pricing for a customer's shipment based on known rates for different shipment carriers and/or delivery zones.

In various embodiments, graph evaluator 310 may be configured as a Boolean expression evaluator in order to test whether a given address is located within a specified region. In some embodiments, graph evaluator 310 may utilize "short circuit" techniques when evaluating disjunctions (logical ORs) and conjunctions (logical ANDs). For instance, graph evaluator 310 may cease evaluation of a disjunction once a child term tests TRUE as a disjunction only requires one TRUE for the entire expression to be TRUE. Similarly, graph evaluator 310 may cease evaluation of a conjunction once a child term tests FALSE as a disjunction only requires one FALSE for the entire expression to be FALSE.

In various embodiments, as unordered or partially-orderable sets of primitives (e.g., overlapping postal code ranges) are replaced with non-overlapping ordered sets of primitives when graph conditioner 314 generates conditioned graph(s) 314, graph evaluator 310 may be configured to quickly process client requests even for regions that were previously represented by large disjunctions (e.g., within graph(s) 324). For instance, consider the logically equivalent subgraphs of FIGS. 2A and 2B described above. For graph evaluator 310 to determine whether an address resides in region R10, the graph evaluator may need to test parameters of the address (e.g., a postal code of the address) against each primitive under the region R10's disjunctive, which includes all regions from R11 to Rn. In some cases, this process may require significant processing resources and/or time. By contrast, to determine whether that same address is located within region R20, which defines a subgraph that is logically equivalent to that of region R10, graph evaluator 310 may use binary search techniques (or some other search technique) on the set of ordered, non-overlapping regions R21-R24. As this operation may be performed in faster-than-linear time (e.g., logarithmic time), graph evaluator 310 may determine test an address against region R20 (i.e., conditioned data) in less time than is required to test that address against region R10 (i.e., unconditioned data).

As described in more detail below, graph conditioner 320 may utilize techniques to broaden the candidate pool of region values (e.g., postal code values) under logical operations (e.g., disjunction/conjunctions) before the batching of primitives into ordered, non-overlapping sets is performed. In some embodiments, broadening the pool of region values need not be completed before batching into sets, as insertions into the set may be performed at a later time. These and other variations are described in more detail below.

Conditioning Subgraphs for Efficient Evaluation

Figure 4:
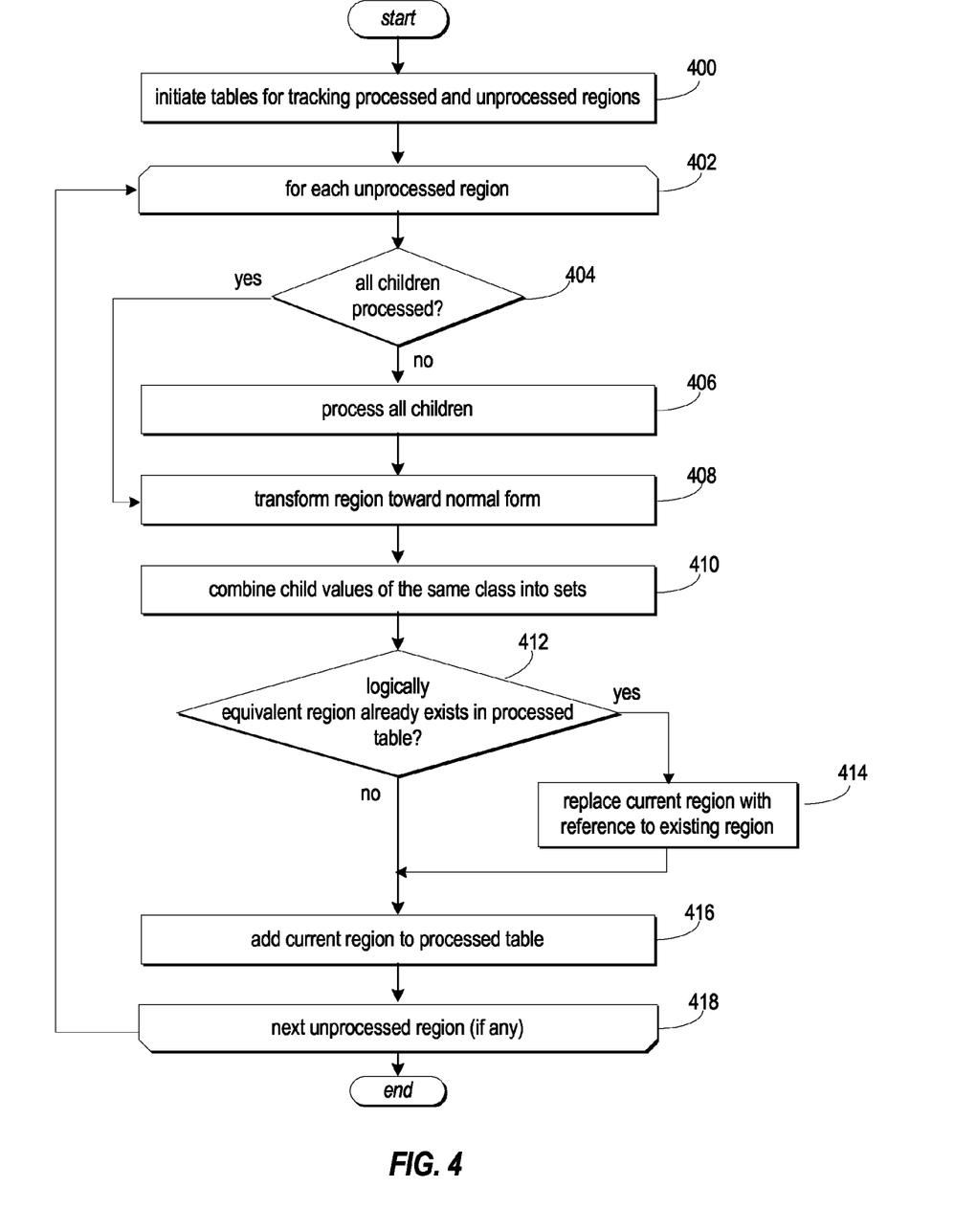
FIG. 4 illustrates a flowchart of an example method for conditioning subgraphs (e.g., regions) of a graph for faster-than-linear-time evaluation, according to some embodiments.

Graph conditioner 320 may utilize various techniques to process the subgraphs of each region within graph(s) 324 to generate conditioned graph(s) 314. FIG. 4 illustrates an example one example of a method that may be implemented by the graph conditioner to process the subgraphs of each region within graph(s) 324 to generate conditioned graph(s) 314. In the illustrated embodiment, the method may include initiating one or more tables (or other data structures) for tracking the processing of each region within the subgraph (block 400). As illustrated at block 402, blocks 404-416 may be performed for each region that has yet to be processed. In the description below, the region that is currently being evaluated may be referred to as the current region. At block 404, the method may include determining whether all of the child nodes of the current region have been processed. If not, each child of the current region may be processed. Generally, child nodes may represent individual primitives or subgraphs. In various embodiments, there may be extensive transformations performed on subgraphs or primitives. Generally, subgraphs can be of arbitrary complexity, and primitives are not restricted to the transformations described herein. One non-limiting example of such a transformation includes addressing involution by removing double negations (e.g., two consecutive "NOT" nodes between a child and its parent). Other transformations are described in more detail below.

Once the child nodes are processed, the method may proceed to block 408, wt which point the method may include performing one or more transformation to transform the current region (e.g., a subgraph) toward conjunctive or disjunctive normal form, although embodiments are not limited to these transformations. Specific operations to perform this portion of the method are described in more detail below; generally these operations are performed in order to, under a given logical operation, group more primitives for batching into sets that may be searched in a time complexity that is faster than linear time (e.g., logarithmic time). As one non-limiting example, prior to transforming the region towards conjunctive or disjunctive normal form, the current region may include a disjunction (e.g., a logical OR) of n terms. After transformation toward conjunctive or disjunctive normal form, this disjunction may have n+1 or more terms. In this way, transforming the range towards conjunctive or disjunctive normal form may "flatten" this subgraph such that more terms may be batched up into non-overlapping sets that may be searched in faster-than-linear time. As noted above, embodiments are not limited to transformations that move a subgraph toward normal form. In general, these transformations may include any transformation that, for a given logical operation (e.g., disjunction) of a transformed subgraph, cause more primitives to be grouped under that logical operation relative to the original subgraph. In this way, for a given logical operation more primitives (in some cases the maximum amount of primitives) may be available for batching into sets that are searchable in logarithmic time (or another time complexity that generally provides faster evaluation than linear time complexity).

In various embodiments, block 408 of the method may but need not transform the region into conjunctive or disjunctive normal form. For instance, a full transformation toward conjunctive or disjunctive normal form may require distribution operations that may have an intractable complexity in some cases. As such, the degree to which the region is transformed toward conjunctive or disjunctive normal form may in some cases depend on the computing resources at the graph conditioner 320's disposal (e.g., the more computing resources available, the closer the graph conditioner may transform each region toward conjunctive or disjunctive normal form). In general, this portion of the method may include performing one or more transformations on the current region's logical operations and primitives in order to generate a new logically equivalent subgraph that also includes one or more logical operations and primitives. In various embodiments, the transformation may be performed such that, for a given logical operation (e.g., a disjunction) of the new subgraph, more primitives are grouped under that logical operation relative to the first representation of the subgraph. For instance, in the new representation of the region, more primitives representing different postal code ranges may be grouped under the same logical operation, such as a disjunction. While at least some of these primitives may overlap, the more primitives that are grouped together under a logical operation, the more primitives that may be batched up into ordered sets of non-overlapping values (which may be searched in faster-than-linear time).

In some embodiments, performing a transformation at block 408 may include eliminating double negation, such as transforming expressions of the form (NOT (NOT p)) into p where p is a primitive. In some embodiments, performing a transformation at block 408 may include moving negations below conjunctions using DeMorgan's law, such as transforming expressions of the form (NOT (AND p q)) to the form (OR (NOT p) (NOT q)) and expression of the form (NOT (OR p q)) to the form (AND (NOT p) (NOT q)), where p and q are primitives. In some embodiments, performing a transformation at block 408 may include removing one or more trivial tautologies, such as transforming expressions of the form (AND False p) to False where p is a primitive, transforming expressions of the form (AND True p) to p, transforming expressions of the form (OR False p) to p, transforming expressions of the form (OR True p) to True, transforming expressions of the form (NOT True) to False, and transforming expressions of the form (NOT False) to True. In various embodiments, these transformations alone may not provide a full transformation to a normal form as a full transformation may require distributing expression of the form (OR p (AND q r)) to the form (AND (OR p q) (OR p r)), where p, q and r are primitives, which may be of an intractable complexity in some cases. In various embodiments, intractable operations need not to be fully (or even partially) completed for the terms to remain logically correct. Each partial application of these operations may result in a logically equivalent term even though that term is not guaranteed to be the simplest equivalent term as a result of stopping transformation before full normal form is achieved. Using these techniques, embodiments may transform the terms as close to normal form as possible given the amount of computation time and resources available. In various embodiments, one or more logic minimization techniques may be applied to subgraphs, including those that have been transformed to normal or near-normal form. One non-limiting example of logic minimization includes the Espresso heuristic logic minimizer. In some embodiments, other heuristic logic minimization techniques may be utilized, whether presently known or developed in the future. In some cases, a full NP-hard minimizer may be utilized when tractable.

At block 410, the method may include combining child values of the same class (e.g., postal codes) into sets. In various embodiments, this may portion of the method may include performing the following transformations of expressions where the notation p:t implies that p is a primitive in class t (e.g., a city, state, district, country or postal code range). Furthermore, in the following transformation, the notation {p,q} may represent a totally ordered set that is logically equivalent to the set of p and q where p and q are of the same class. In various embodiments, one of the transformations may include transforming expressions of the form (AND p:t1 q:t1 r:t2) to the form (AND s r) where s is the intersection of p and q. In various embodiments, another one of the transformations may include transforming expressions of the form (AND (NOT p:t1) (NOT q:t1) r:t2) to the form (AND (NOT {p,q}) r). In various embodiments, another one of the transformations may include transforming expressions of the form (OR p:t1 q:t1 r:t2) to the form (OR {p,q} r). In various embodiments, another one of the transformations may include transforming expressions of the form (OR (NOT p:t1) (NOT q:t1) r:t2) to the form (OR (NOT s) r) where s is the intersection of p and q. By utilizing these transformations, embodiments of the method may transform previously unorderable (or only partially orderable) ranges of values to a set of ordered, non-overlapping values that, as described above, may be searched in faster-than-linear-time (e.g., logarithmic time). In this way, the graph evaluator, when using graphs conditioned in this manner (e.g., conditioned graph(s) 314) may quickly find results the result using faster-than-linear-time search techniques, examples of which include binary search techniques applied to the aforesaid ordered, non-overlapping values. In a small number of cases (e.g., for very simple disjunctions with few primitives or other logical operations that are not very complex), evaluating the untransformed subgraph may prove to be faster than evaluating new subgraph including the searchable set of ordered, non-overlapping values. Generally, dependent on a given logical operation's complexity (e.g., a very large disjunction with many primitive values, at least some of which overlap), the requisite time to perform a search operation for a value within the ordered set of non-overlapping values will be less than a requisite time to perform the original logical operation on its primitives. As searching (e.g., binary searching) of an ordered set of non-overlapping values may be performed in logarithmic time, the techniques described herein may in the aggregate provide a significant reduction in processing time when evaluating transformed subgraphs (which in their previous form were evaluated in linear time as unorderable or only partially-orderable values).

Once a given region has been transformed, the method at block 412 may include determining whether a logically equivalent region already exists in the processed table. For instance, the method may include generating a hash value based on the transformed region and determining whether that region already resides in the table of processed regions. If that hash does already exist in the list of processed regions (block 414), the method may include replacing the current transformed region with a reference to the subgraph that represents the region that has already been added to the processed list. In some embodiments, this may include replacing the current region with a new primitive class (e.g., an ID class) that has a single child node holding the value to the referenced subgraph. In this way embodiments may substantially reduce the size of the graphs by eliminating many forms of redundancy. In other cases, if the hash of the current transformed region is not already included in the list of processed nodes (block 416), the method may include adding region to the processed table (e.g., adding the hash of the current region to the processed table. As indicated by block 418, various portions of the method may be repeated for each region of the graph. At the conclusion of the method, one or more conditioned graph(s) 314 may be generated.

In the above-described method, some operations (e.g., block 410) may include performing a union operation on overlapping values (e.g., overlapping postal code values) to generate a totally ordered set {p,q}. An example of a modified merge-sort operation that may be utilized to generate such a set is described herein. For instance, in various embodiments, unmodified postal code ranges may be represented as only a partially orderable set before transformation. By modifying this set with the merge-sort operations, the non-orderable elements of this set may transform the set into an equivalent set for the purpose of the Boolean evaluation into a set of totally orderable ranges. For example, given the postal code ranges {(0-2), (4-6), (5-7), (1-1)}, each set may be divided in half to form the following sets, {{(0-2), (4-6)}, {(5-7), (1-1)}}. These sets may be divided in half again to identify the based case for each set having a single element, which may be represented as, {{40-2)}, {(4-6)}}, {{(5-7)}, {(1-1)}}. Next, the first two sets may be merged, iterating each element of both sets and inserting the smallest element into the new set at each iteration to form, {{(0-2), (4-6)}, {{(5-7)}, {(1-1)}}}. The previous operation may be repeated on the latter two sets to form such that the sets are represented as {{(0-2), (4-6)}, {(1-1), (5-7)}} When attempting to iterate the two remaining sets, it may be determined that the ranges (0-2) and (1-1) are not orderable, as they overlap. In accordance with the techniques described herein, the union of the two ranges may be determined and the result of this union may be inserted into the new set two consume both ranges. This operation may be performed on the remaining two elements. As these ranges are not orderable, the union may be taken again, leaving the totally ordered set of ranges {(0-2), (4-7)}, which may be structurally different than the original set yet equivalent for evaluation purposes. Using techniques similar to these, embodiments may consistently transform partially orderable sets into totally ordered sets which can then be searched in faster-than-linear time (e.g., logarithmic time).

In some embodiments, the method described above with respect to FIG. 4 may represent a first pass performed on a graph to generate conditioned graphs 314. In a second traversal of the graph, embodiments may include performing factorization where tractable. Furthermore, the graph may be re-deepened by utilizing (reverse) DeMorgan's law to negate all child terms and reduce the number of negations by at least one. For instance, consider the example of determining whether a customer address is both not in Washington and not in Oregon. Prior to the re-deepening process, there is a Washington node, an Oregon node, two logical NOTs over each of the state nodes and a logical AND node above the logical NOTs for a total of 5 nodes in the subgraph. Performing a (reverse) DeMorgan's operation may reduce these 5 nodes to 4 nodes and thus there will be fewer nodes for graph evaluator 310 to evaluate. In addition to these re-deepening techniques, embodiments may also include factoring out common terms during the second pass of the graph. For instance, considering the example of determining whether a customer address is found in i) the country USA and the state Washington and ii) the country USA and the state Oregon. In this example embodiments may factor out the country term (USA in this case) such that evaluation of this term is performed only once for this subgraph. In this case, the evaluation of the states may be pushed further down in the subgraph (e.g., as a conjunction under another conjunction with the USA term) and thus "deepening" the tree. As the aforesaid modification reduces the quantity of terms the graph evaluator must evaluate, the processing time for processing requests may be reduced.

In various embodiments, throughout the first pass (e.g., FIG. 4) and the second pass described above, each region may be reference counted by the number of graph nodes it has as a parent. When a nodes reference count is reduced to zero, embodiments may include removing that node from the graph to conserve memory space. In some cases, there may be one or more regions that are known to be query by the outside world (e.g., by client system 300 or some other system). To prevent these regions from being culled from the graph, embodiments may include intentionally incrementing the corresponding reference counts for these regions.

Graph Conditioning Example

Figure 5:
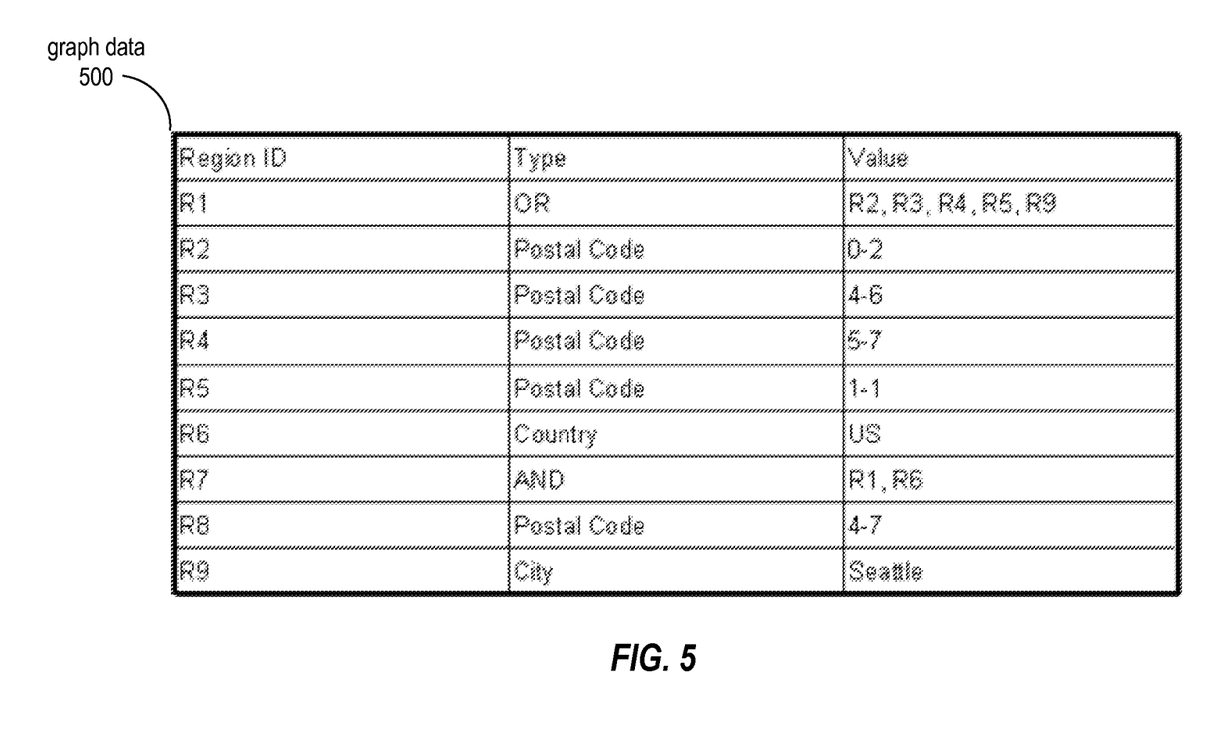
FIGS. 5-8 illustrate example graph data that is transformed according to the conditioning techniques of various embodiments.

One example transformation according to the above described techniques is described below with respect to FIGS. 5-8. For clarity of description example, it may be assumed that transformations for moving the regions toward conjunctive normal form or disjunctive normal form have already been performed. FIG. 5 illustrates graph data 500 that defines the regions R1-R9, which are evaluated in this example. Furthermore, in this particular non-limiting example, it may be known that graph evaluator 310 must be able to query regions R7 and R8.

Condition of the data may begin with iterating through the regions. For instance, region R1 includes region R2 as a child, which is not in the (currently empty) processed list; as such, embodiments may iterate forward to Region 2. In this example, region R2 has no viable transformations, so it is moved to the processed table unchanged, as are regions R3-R6. Region R7 has child R1 which is not processed so this region remains in the unprocessed table. Regions R8 and R9 may also move to the processed table without transformation.

Figure 6:
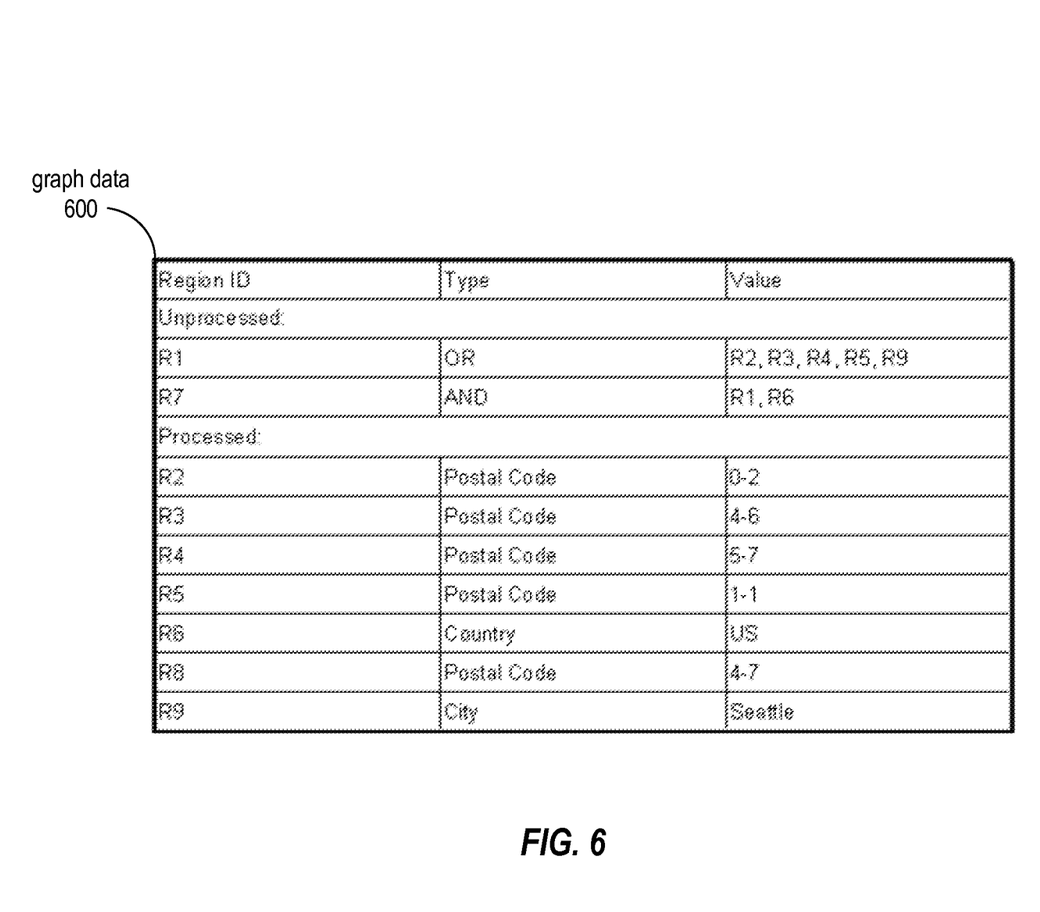

After the first pass of conditioning, the processed and unprocessed tables are illustrated by graph data 600 of FIG. 6.

In the second pass, embodiments may determine that all child regions of region R1 have been processed. In accordance with the conditioning method (e.g., FIG. 4), embodiments may proceed to process region R1, which represents a disjunction of regions R2, R3, R4, R5 and R9 in the illustrated embodiment of FIG. 6. When evaluating region R1, embodiments may determine that the region is of the form (OR p:t1 q:t1 r:t2) and (as described above with respect to block 410 of FIG. 4) is to be transformed to the form (OR {p, q} r) by utilizing the techniques described above (e.g., a modified merge sort that transforms partially orderable values into totally ordered sets).

Figure 7:
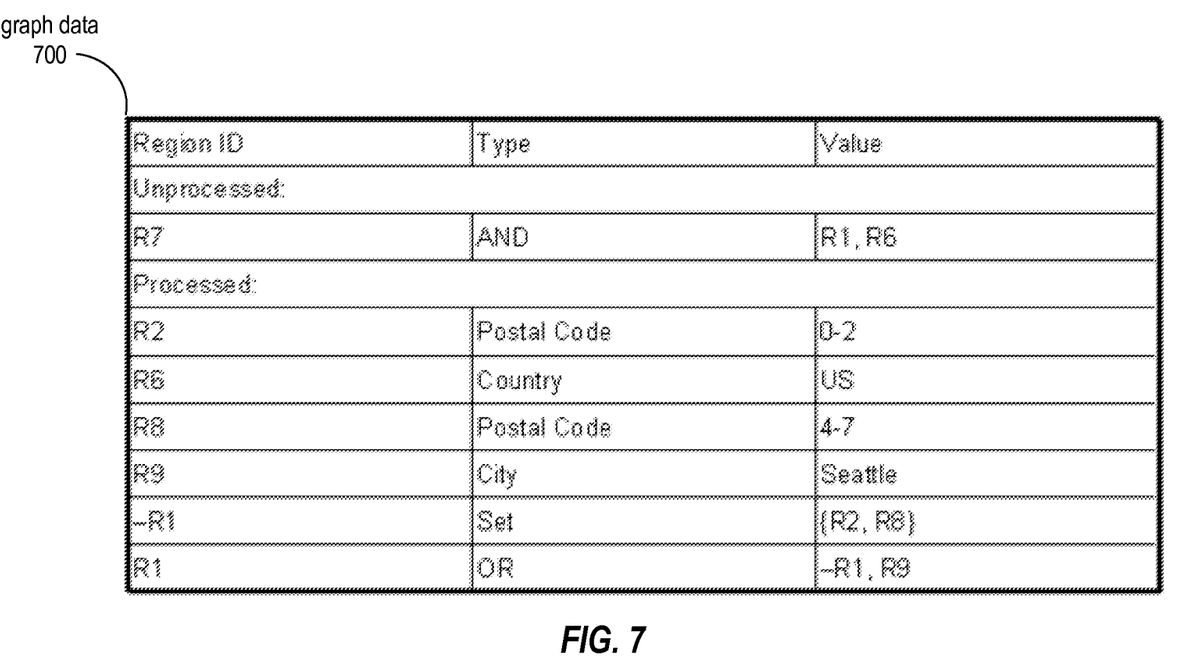

As the values for this example are the same as the example merge sort describe above with respect to FIG. 4, it should be apparent that two specific postal code ranges result from this merge sort, the existing range 0-2, and the new range 4-7. Since an equivalent range 4-7 already exists in the processed regions, the existing node may be referenced rather than create a new node (thereby decreasing the memory footprint of the graph). Embodiments may further include creating a new set node to contain the postal code elements. To avoid naming conflicts, the new set may have a region ID of −R1, as illustrated in the processed table of graph data 700 of FIG. 7. The resulting transformed node may be added to the processed region table. Furthermore, the reference counts for regions R3, R4 and R5 may be decremented as region R1 no longer references them. This may leave these nodes unreferenced. As such, embodiments may include removing regions R3, R4 and R5 form the table altogether (as illustrated in FIG. 7). Furthermore, region R1 is removed from the unprocessed nodes and transitioned to the list of process nodes. This results in the unprocessed table containing only region R7. Furthermore, as region R7 has all of its children in the processed table, it is considered for evaluation. In this particular example, there are no applicable transformations and region R7 is thus moved to the processed table unchanged, as illustrated by graph data 800 of FIG. 8. The second pass is started to reduce negations with DeMorgan's law and to factor out common terms. In this simple example, there are neither any negations nor common terms for clarity of illustration.

Note that in various embodiments, the techniques described above may also be applied to the discovery of equivalent compound subgraphs after transformation. For instance, a subgraph defined by (AND (country US) (OR (postal 1-3) (postal (4-6))) may be equivalent to a subgraph defined by (AND (country US) (OR (postal 1-2) (postal (2-3) (postal (4-6))) after transformation and may be transformed to a node of the ID class (e.g., to reduce the memory footprint of the overall graph by replacing a subgraph with a reference to a previously evaluated logically equivalent subgraph).

Figure 8:
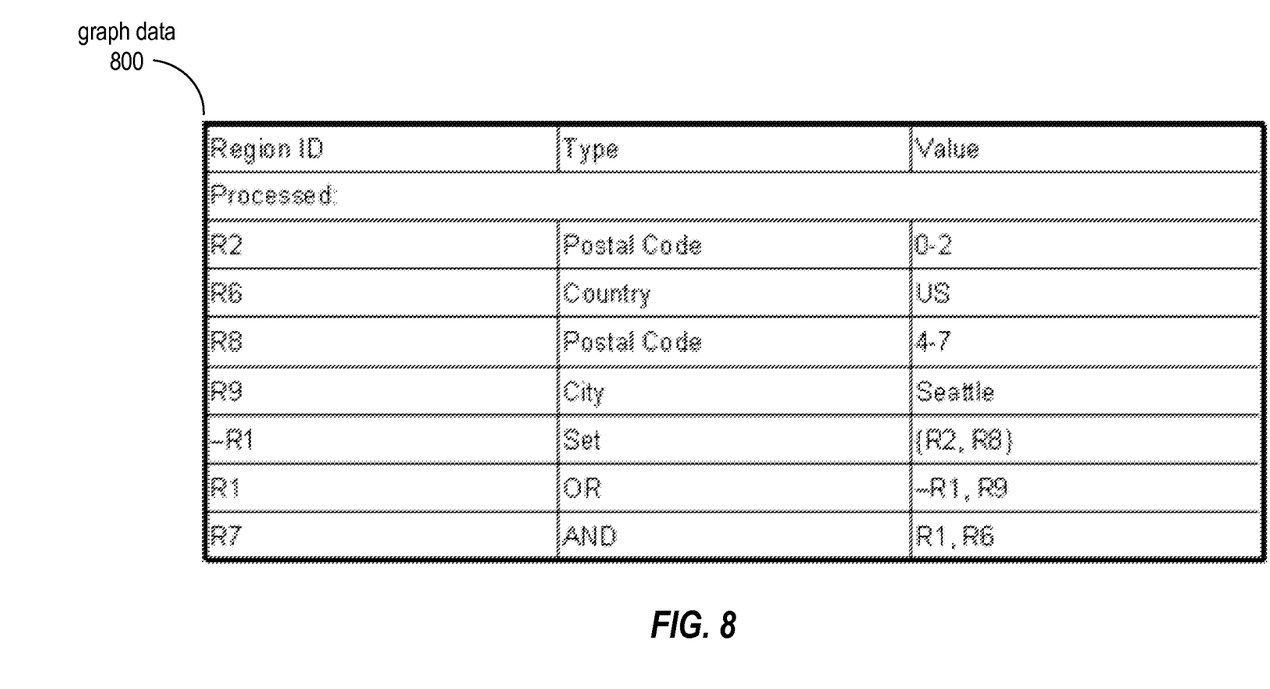

The final list of processed regions of FIG. 8 may be equivalent to the input regions for regions R7 and R8. Furthermore, the four postal codes under region R1 have been reduced to two and are now totally ordered and searchable in logarithmic time rather than linear time. Furthermore, there are no redundant subgraphs in various embodiments. Additionally, while regions R7 and R8 previously shared no common children in the input, region R8 is now in the subgraph of region R7 since region R8 was equivalent to a union of multiple postal code regions in the original subgraph of region R7.

In various embodiments, the techniques described herein may be applied to information other than geographic regions or locations. For instance, since the transformations described herein may be applicable to any Boolean expressions, and take advantage of totally orderable sets (or partially orderable sets that are transformable to totally ordered sets not limited to using the techniques described herein), the embodiments described herein need not be limited to the particular primitive classes described herein. In one non-limiting example, the techniques described herein may be applied to regulatory compliance rules for shipment methods given shipment contents as an input. In various embodiments, other types of information may be utilized according to the graph conditioning and evaluation techniques described herein.

Example Computer System

Various embodiments of the system and method for graph conditioning with non-overlapping orderable values for efficient graph evaluation, as described herein, may be executed on one or more computer systems, which may interact with various other devices. Note that any component, action, or functionality described above with respect to FIGS. 1-8 may be implemented on one or more computers configured as computer system 900 of FIG. 9, according to various embodiments. In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices 950, such as cursor control device 960, keyboard 970, and display(s) 980. In some cases, it is contemplated that embodiments may be implemented using a single instance of computer system 900, while in other embodiments multiple such systems, or multiple nodes making up computer system 900, may be configured to host different portions or instances of embodiments. For example, in one embodiment some elements may be implemented via one or more nodes of computer system 900 that are distinct from those nodes implementing other elements.

Figure 9:
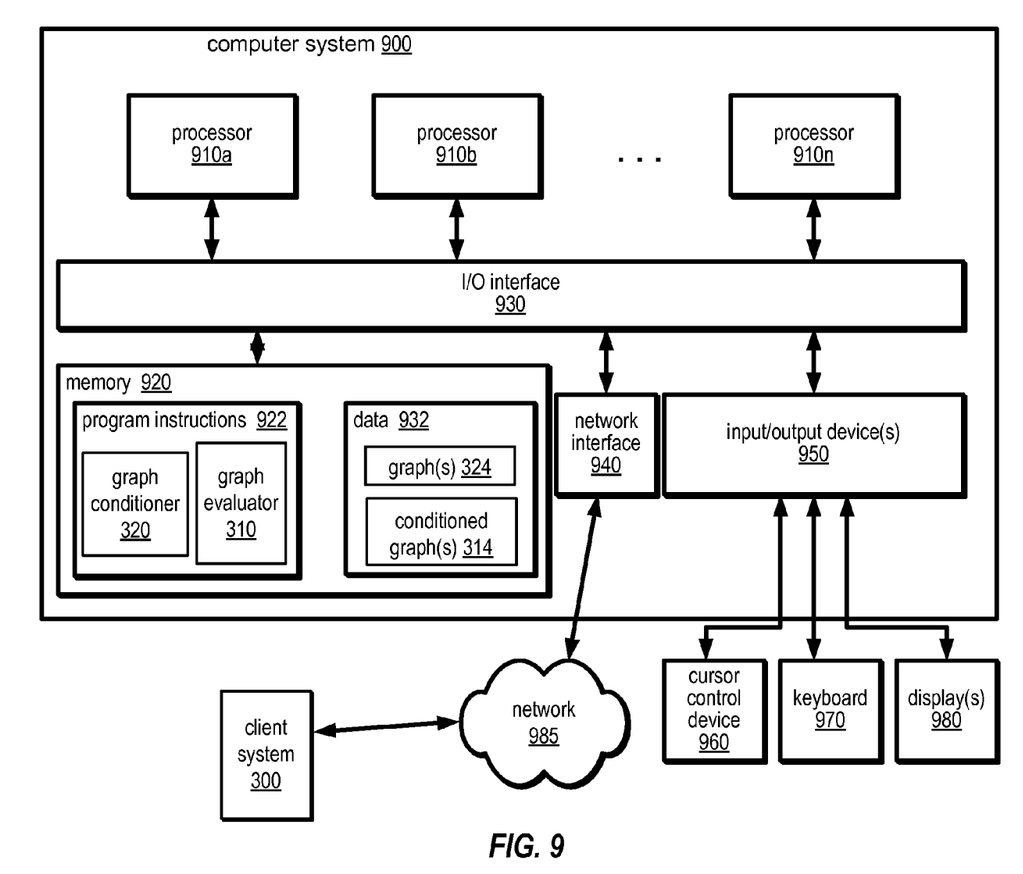
FIG. 9 illustrates one example of a computer system suitable for implementing various elements of the system and method for graph conditioning with non-overlapping orderable values for efficient graph evaluation, according to some embodiments.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store program instructions 922 and/or data 932 accessible by processor 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions 922 may be configured to implement any functionality of graph conditioner 320 and graph evaluator 310 described above. Additionally, data 932 of memory 920 may store any of the information or data structures described above, including but not limited to graph(s) 324 and conditioned graph(s) 314 and in at least some cases relational data store tables. In some embodiments, program instructions and/or data may be received, sent or stored upon different types of computer-accessible media or on similar media separate from system memory 920 or computer system 900. While computer system 900 is described as implementing the functionality of functional blocks of previous Figures, any of the functionality described herein may be implemented via such a computer system.

In one embodiment, I/O interface 930 may be configured to coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network 985 (e.g., client system 300) or between nodes of computer system 900. Network 985 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 950 may, in some embodiments, include one or more display terminals, keyboards, keypads, touchpads, scanning devices, voice or optical recognition devices, or any other devices suitable for entering or accessing data by one or more computer systems 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

As shown in FIG. 9, memory 920 may include program instructions 922, which may be processor-executable to implement any element or action described above. In one embodiment, the program instructions may implement the methods described above, such as the method illustrated by FIG. 4. In other embodiments, different elements and data may be included. Note that data 932 may include any data or information described above.

Those skilled in the art will appreciate that computer system 900 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A computer-implemented method, comprising:
performing one or more transformations on a subgraph comprising logical operations and associated primitives of one or more classes, wherein respective primitives of the common class represents respective geographic regions, to generate a second logically equivalent subgraph that also includes logical operations and associated primitives, wherein the one or more transformations are performed such that, for a given logical operation of the second subgraph, a partially-ordered plurality of child primitives of a common class are transformed into a logically-equivalent totally-ordered set of non-overlapping geographic regions, wherein the one or more transformations comprises:
  transforming the logical operation of the partially-ordered plurality of geographic regions of a common class into a logically-equivalent partially-ordered set of the plurality of geographic regions, wherein at least two of the geographic regions overlap,
  transforming the partially-ordered set of the plurality of geographic regions into a logically-equivalent plurality of sets, where a given set of the plurality of sets is a set of a separate geographic region of the plurality of geographic regions and at least two sets comprise overlapping geographic regions; and
  transforming the plurality of sets into a logically-equivalent totally-ordered set of non-overlapping geographic regions, wherein the transforming comprises:
    iteratively inserting respective geographic regions of the plurality of sets, into the single set, in increasing order,
    wherein iteratively inserting the at least two overlapping geographic regions into the single set comprises performing one or more union operations on the at least two overlapping geographic regions to generate at least one orderable geographic region and inserting the at least one orderable geographic region into the single set in place of the at least two overlapping geographic regions;
  wherein dependent on the given logical operation's complexity, a requisite time to perform a search operation for a geographic location within the totally-ordered set of non-overlapping geographic regions is less than the requisite time to perform the given logical operation on the geographic regions.

2. The computer-implemented method of claim 1, wherein the method further comprises:
  receiving a request from a client, the request specifying an address to test for inclusion within the geographic regions of the second subgraph; and
  evaluating the ordered set of non-overlapping geographic regions to determine whether said address is located within those regions; and
  providing a response to the client, the response indicating whether the address is located within those regions.

3. The computer implemented method of claim 2, wherein said evaluating includes performing a binary search on the ordered set of non-overlapping geographic regions in logarithmic time.

4. A computer-implemented method, comprising:
  performing one or more transformations on a subgraph comprising logical operations and associated primitives of one or more classes, to generate a second logically equivalent subgraph that also includes logical operations and associated primitives, wherein the one or more transformations are performed such that, for a given logical operation of the second subgraph, a partially-ordered plurality of child primitives of a common class are transformed into a logically-equivalent totally-ordered set of non-overlapping values, wherein the one or more transformations comprises:
    transforming the logical operation of the partially-ordered plurality of primitives of a common class into a logically-equivalent partially-ordered set of the plurality of primitives, wherein at least two of the primitives have overlapping values,
    transforming the partially-ordered set of the plurality of primitives into a logically-equivalent plurality of sets, where a given set of the plurality of sets is a set of a separate primitive of the plurality of primitives; and
    transforming the plurality of sets into a logically-equivalent totally-ordered set of non-overlapping primitives, wherein dependent on the given logical operation's complexity, a requisite time to perform a search operation for a value within the totally-ordered set of primitives is less than a requisite time to perform the given logical operation on the child primitives, wherein the transforming comprises iteratively inserting respective primitives of the plurality of sets, into the single set, in increasing order.

5. The computer-implemented method of claim 4, wherein the logical operations include one or more Boolean operations.

6. The computer-implemented method of claim 4, wherein the ordered set of non-overlapping values includes postal code values defining a geographic region.

7. The computer-implemented method of claim 6, wherein the method further comprises:
  evaluating a request to determine whether an address resides within said geographic region, wherein evaluating the request comprises performing a search on said ordered set of non-overlapping values to determine whether a postal code value specified by said address is included within that ordered set of non-overlapping values, and
  providing a result of that evaluation.

8. The computer-implemented method of claim 7, wherein said search is a binary search performed in logarithmic time.

9. The computer-implemented method of claim 4, wherein performing said one or more transformations comprises transitioning the subgraph toward normal conjunctive form or normal disjunctive form.

10. The computer-implemented method of claim 4, wherein said subgraph is a part of an acyclic directed graph.

11. The computer-implemented method of claim 10, wherein the method comprises repeating said one or more transformations for multiple subgraphs of said acyclic directed graph.

12. The computer-implemented method of claim 10, wherein the method comprises generating a list of hash values that identify one or more previously transformed subgraphs; wherein the method further comprises, for a given subgraph, determining that an other subgraph equivalent to the given subgraph has already been generated by identifying a hash value for the given subgraph within the list of hash values.

13. The computer-implemented method of claim 12, wherein the method comprises, within the acyclic directed graph, replacing the given subgraph with a reference to the other subgraph that is equivalent to the given subgraph.

14. The computer-implemented method of claim 10, wherein the method comprises using a transformation based on DeMorgan's law to reduce the number of logical operations within the acyclic directed graph.

15. The computer-implemented method of claim 10, wherein the method comprises factoring out logical operations from one or more expressions to reduce the number of logical operations within the acyclic directed graph.

16. A system, comprising:
  one or more hardware memories; and
  one or more hardware processors coupled to the one or more hardware memories, wherein the one or more hardware memories comprise program instructions executable by the one or more hardware processors to:

perform one or more transformations on a subgraph comprising logical operations and associated primitives of one or more classes to generate a second logically equivalent subgraph that also includes logical operations and associated primitives, wherein the one or more transformations are performed such that, for a disjunction operation of the second subgraph, a partially-ordered plurality of child primitives of a common class are transformed into a logically-equivalent totally-ordered set of non-overlapping values, wherein the one or more transformations comprises:

transforming the logical operation of the partially-ordered plurality of primitives of a common class into a logically-equivalent partially-ordered set of the plurality of primitives, wherein at least two of the primitives have overlapping values,     transforming the partially-ordered set of the plurality of primitives into a logically-equivalent plurality of sets, where a given set of the plurality of sets is a set of a separate primitive of the plurality of primitives; and     transforming the plurality of sets into a logically-equivalent totally-ordered set of non-overlapping primitives, wherein dependent on the given logical operation's complexity, a requisite time to perform a search operation for a value within the totally-ordered set of primitives is less than a requisite time to perform the given logical operation on the child primitives, wherein the transforming comprises iteratively inserting respective primitives of the plurality of sets, into the single set, in increasing order.

17. The system of claim 16, wherein the logical operations include one or more Boolean operations.

18. The system of claim 16, wherein the ordered set of non-overlapping values includes postal code values defining a geographic region.

19. The system of claim 18, wherein the system is configured to:

evaluate a request to determine whether an address resides within said geographic region, wherein evaluating the request comprises performing a search on said ordered set of non-overlapping values to determine whether a postal code value specified by said address is included within that ordered set of non-overlapping values, and provide a result of that evaluation.

20. The system of claim 19, wherein said search is a binary search performed in logarithmic time.

21. The system of claim 16, wherein performing said one or more transformations comprises transitioning the subgraph toward normal conjunctive form or normal disjunctive form.

22. A non-transitory computer-readable storage medium, storing program instructions computer-executable on a computer to:

perform one or more transformations on a subgraph comprising logical operations and associated primitives to generate a second logically equivalent subgraph that also includes logical operations and associated primitives of one or more classes, wherein the one or more transformations are performed such that, for a given logical operation of the second subgraph, a partially-ordered plurality of child primitives of a common class are transformed into a logically-equivalent totally-ordered set of non-overlapping values, wherein the one or more transformations comprises:

transforming the logical operation of the partially-ordered plurality of primitives of a common class into a logically-equivalent partially-ordered set of the plurality of primitives, wherein at least two of the primitives have overlapping values,     transforming the partially-ordered set of the plurality of primitives into a logically-equivalent plurality of sets, where a given set of the plurality of sets is a set of a separate primitive of the plurality of primitives; and     transforming the plurality of sets into a logically-equivalent totally-ordered set of non-overlapping primitives, wherein dependent on the given logical operation's complexity, a requisite time to perform a search operation for a value within the totally-ordered set of primitives is less than a requisite time to perform the given logical operation on the child primitives, wherein the transforming comprises iteratively inserting respective primitives of the plurality of sets, into the single set, in increasing order.

23. The non-transitory computer-readable storage medium of claim 22, wherein said subgraph is a part of an acyclic directed graph.

24. The non-transitory computer-readable storage medium of claim 23, wherein the program instructions are configured to repeat said one or more transformations for multiple subgraphs of said acyclic directed graph.

25. The non-transitory computer-readable storage medium of claim 23, wherein the program instructions are configured to generate a list of hash values that identify one or more previously transformed subgraphs; wherein the program instructions are further configured to, for a given subgraph, determine that an other subgraph equivalent to the given subgraph has already been generated by identifying a hash value for the given subgraph within the list of hash values.

26. The non-transitory computer-readable storage medium of claim 25, wherein the program instructions are configured to, within the acyclic directed graph, replace the given subgraph with a reference to the other subgraph that is equivalent to the given subgraph.

27. The non-transitory computer-readable storage medium of claim 23, wherein the program instructions are configured to use a transformation based on DeMorgan's law to reduce the number of logical operations within the acyclic directed graph.

28. The non-transitory computer-readable storage medium of claim 23, wherein the program instructions are configured to factor out logical operations from one or more expressions to reduce the number of logical operations within the acyclic directed graph.

* * * * *